US011300756B2

(12) United States Patent
Ishimoda

(10) Patent No.: US 11,300,756 B2
(45) Date of Patent: Apr. 12, 2022

(54) METHOD FOR ADJUSTING LOUPE AND LOUPE

(71) Applicant: Konica Minolta, Inc., Tokyo (JP)

(72) Inventor: Isao Ishimoda, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 252 days.

(21) Appl. No.: 16/339,229

(22) PCT Filed: Oct. 20, 2017

(86) PCT No.: PCT/JP2017/037925
§ 371 (c)(1),
(2) Date: Apr. 3, 2019

(87) PCT Pub. No.: WO2018/079422
PCT Pub. Date: May 3, 2018

(65) Prior Publication Data
US 2019/0235200 A1 Aug. 1, 2019

(30) Foreign Application Priority Data
Oct. 25, 2016 (JP) .............................. JP2016-208311

(51) Int. Cl.
*G02B 15/14* (2006.01)
*G02B 25/00* (2006.01)
(Continued)

(52) U.S. Cl.
CPC ................ *G02B 7/06* (2013.01); *G02B 7/02* (2013.01); *G02B 15/144* (2019.08); *G02B 25/00* (2013.01)

(58) Field of Classification Search
CPC ... G02C 7/08; G02C 7/02; G02C 5/00; G02C 11/00; G02B 15/173; G02B 25/004;
(Continued)

(56) References Cited

U.S. PATENT DOCUMENTS

2015/0331230 A1* 11/2015 Wilt ..................... G02B 25/005
                                                                            349/33
2017/0153442 A1*  6/2017 Ishimoda .............. G02B 7/021
2018/0196282 A1*  7/2018 Yonezawa ............. G02C 7/088

FOREIGN PATENT DOCUMENTS

CN         105190401 A      12/2015
WO      2015194409 A1       12/2015

OTHER PUBLICATIONS

International Preliminary Report on Patentability issued in Application No. PCT/JP2017/037925, dated Apr. 30, 2019 (13 pages).

(Continued)

*Primary Examiner* — Dawayne Pinkney
(74) *Attorney, Agent, or Firm* — Osha Bergman Watanabe & Burton LLP

(57) ABSTRACT

A method is provided for adjusting a loupe including an eyepiece and a tube framework having a first optical system adjacent to an object and a second optical system adjacent to the eyepiece. At least two zoom lenses in the first optical system shift along an optical axis between a first and a second position to change magnification. The method includes shifting at least one lens in the first optical system such that a distance at which the object is focused when the zoom lenses are shifted to the first position is substantially equal to a distance at which the object is focused when the zoom lenses are shifted to the second position; and then shifting at least one lens in the second optical system along the optical axis such that the object is focused when the zoom lenses are shifted to the first position or the second position.

6 Claims, 13 Drawing Sheets

(51) Int. Cl.
      *G02B 7/02*           (2021.01)
      *G02C 5/00*           (2006.01)
      *G02C 7/02*           (2006.01)
      *G02B 7/06*           (2021.01)

(58) Field of Classification Search
      CPC .......... G02B 7/023; G02B 7/04; G02B 7/102;
                  G02B 7/10; G02B 15/177; G02B 25/001;
                              G02B 7/002; G02B 23/18
      USPC ....... 359/684, 481, 816, 822–823, 825, 694,
                  359/699–702, 704, 689, 644–645, 686,
                  359/695, 411–413; 351/41, 159.01, 158
      See application file for complete search history.

(56)                 References Cited

OTHER PUBLICATIONS

Office Action issued in corresponding Chinese Patent Application No. 201780065139.6, dated Oct. 22, 2020, with translation (15 pages).
Office Action issued in the counterpart Chinese Patent Application No. 201780065139.6, dated Jul. 6, 2021 (12 pages).

\* cited by examiner

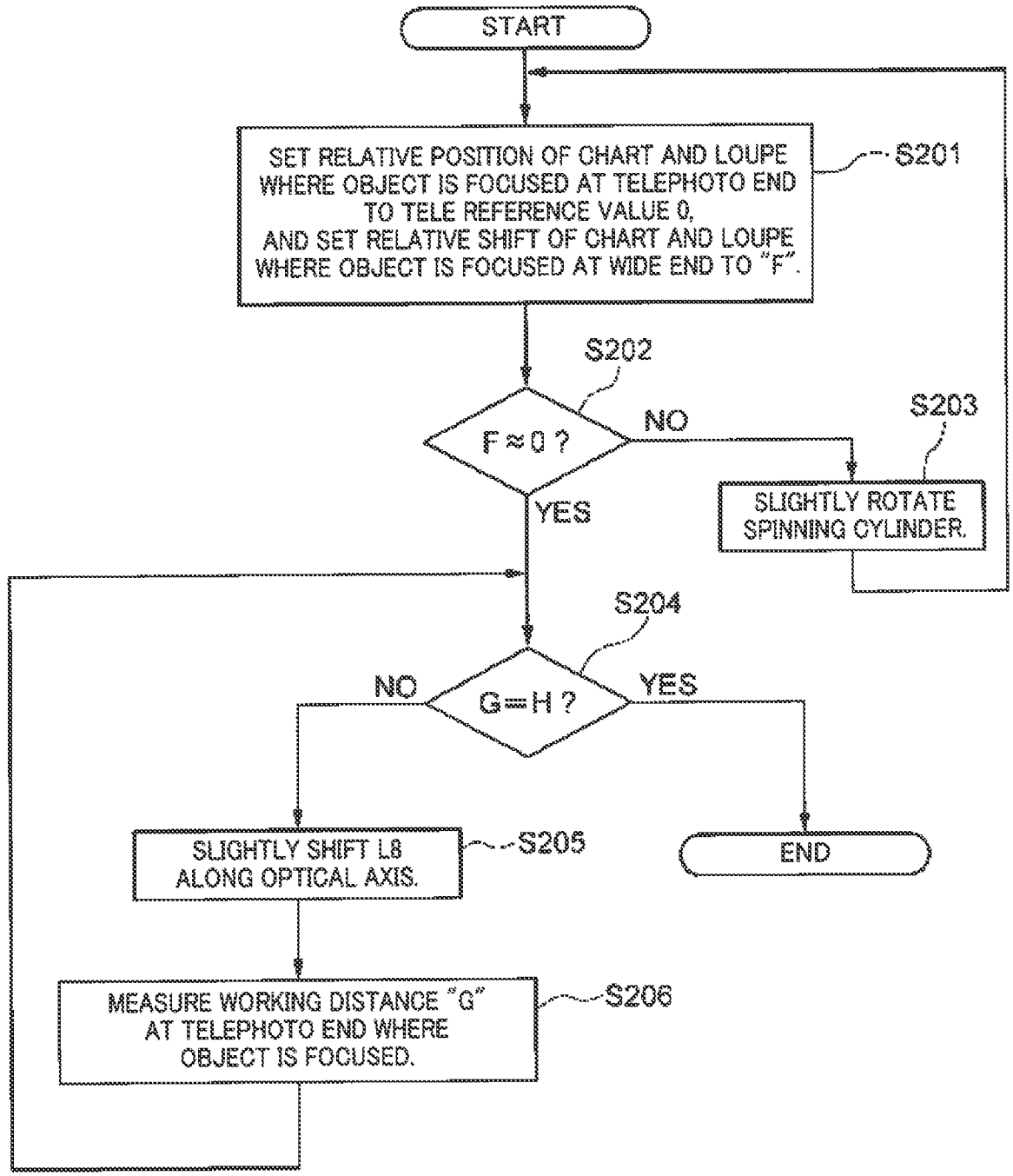

METHOD FOR ADJUSTING LOUPE AND LOUPE

CROSS-REFERENCE TO RELATED APPLICATION

This is a national phase application of International Application No. PCT/JP2017/037925 filed on Oct. 20, 2017, which claims priority to Japanese Patent Application No. 2016-208311 filed Oct. 25, 2016, both of which are incorporated herein by reference.

BACKGROUND

Technical Field

The present invention relates to a method for adjusting a loupe, especially a variable magnification loupe, and a loupe adjusted in this method.

Description of the Related Art

Loupes are known in medical fields. Medical users, such as surgeons and dentists, wear the loupes on their heads to observe the optically enlarged images of target sites for operations. The loupes are designed to be fixed to the head of users by glasses-type holders. Loupes that can change the magnification of target objects by displacing some parts of the optical systems to the optical axis direction is already invented, in response to the demands of users to enable the optical enlargement of objective target sites (see Patent Document 1).

CITATION LIST

Patent Document

Patent Document 1: US 2015/0331230 A

Variable magnification loupes have complicated zooming mechanisms and thus lead to increases in size and weight of the loupes. At the same time, decreases in size and weight of loupes are required to reduce the user burden. The miniaturization of diameters of optical systems is inevitable for the downsizing and weight reduction of loupes while embracing zoom mechanisms. Nevertheless, the miniaturization of optical systems generally leads to an increase in error sensitivity of lenses. In addition, the increase in error sensitivity of lenses can bring inconsistency in the actual observed values of optical systems in comparison to the theoretical values, derived from manufacturing errors. Especially for loupes with magnifying functions, the change of magnification may bring a noticeable difference in visibility due to increases in fabrication errors caused by high error sensitivity of, for instance, lenses, and increases in number of parts. Although a relatively small difference in visibility is less problematic, a large difference in visibility increase the user burden for the following reason: When a user, wearing the loupe on the head, adjusts the magnifications while observing the object through the loupe, the distance between the eye and the object on focus (called the working distance) for each magnification deviates from the ideal value, and thus he/she must position the head back and forth to focus on the object.

SUMMARY

One or more embodiments of the present invention provide a small and light weight variable magnification loupe and a method for adjusting the loupe where a desired distance for focusing on the object (working distance) can be achieved with a desired visibility at the timing of magnification, resulting in a reduction in user burden.

One or more embodiments of the present invention provide a method for adjusting a loupe worn around a head of a user such that the user views an enlarged image of an object, wherein the loupe includes a tube framework having a first optical system adjacent to the object and a second optical system adjacent to an eyepiece compared to the first optical system, and at least two zoom lenses in the first optical system and the second optical system are shifted along an optical axis between a first magnification position and a second magnification position to change magnification, the method comprising:

shifting at least one lens in the first optical system such that a distance at which the object is focused when the zoom lenses are shifted to the first magnification position is substantially equal to a distance at which the object is focused when the zoom lenses are shifted to the second magnification position; and then shifting at least one lens in the second optical system along the optical axis such that the object is focused at a desired visibility when the zoom lenses are shifted to the first magnification position or the second magnification position.

One or more embodiments of the present invention provide a small and light weight variable magnification loupe and a method for adjusting the loupe where a desired distance for focusing on the object (working distance) can be achieved with a desired visibility at the timing of magnification, resulting in a reduction in user burden.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 13 is a flowchart illustrating a method for automatically adjusting a loupe 100 with a controller according to one or more embodiments.

DETAILED DESCRIPTION OF EMBODIMENTS

Hereinafter, embodiments of the present invention will be described with reference to the drawings. However, the scope of the invention is not limited to the disclosed embodiments.

Figure 1:
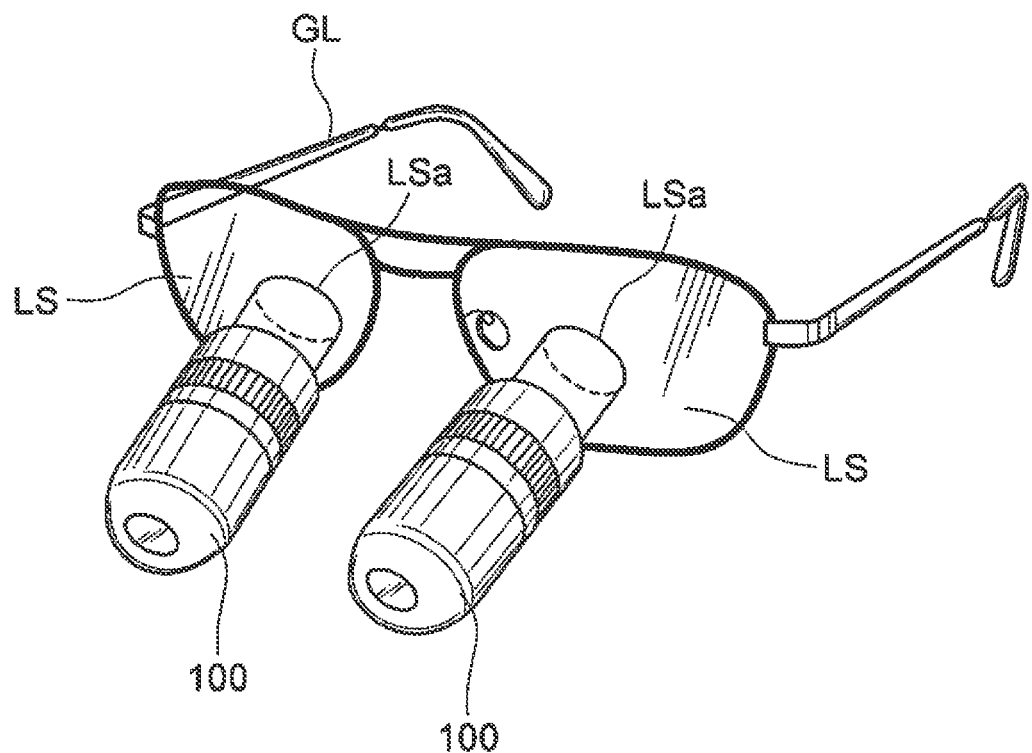
FIG. 1 is a perspective outline view of a glasses-type holder provided with loupes according to one or more embodiments.

FIG. 1 is a perspective outline view of a glasses-type holder provided with loupes according to one or more embodiments. The foreside of a loupe 100 is an object side and the backside is an eyepiece side.

As shown in FIG. 1, two loupes 100 are attached with adhesives to holes LSa in transparent plates LS of glasses type holder GL. When a medical doctor wears the glasses-type holder GL on his/her face before the operation, the loupes 100 are disposed in front of the respective pupils. The doctor can observe an enlarged affected area. Since the two loupes 100 have the same structure, a single loupe 100 will be described below.

Figure 2:
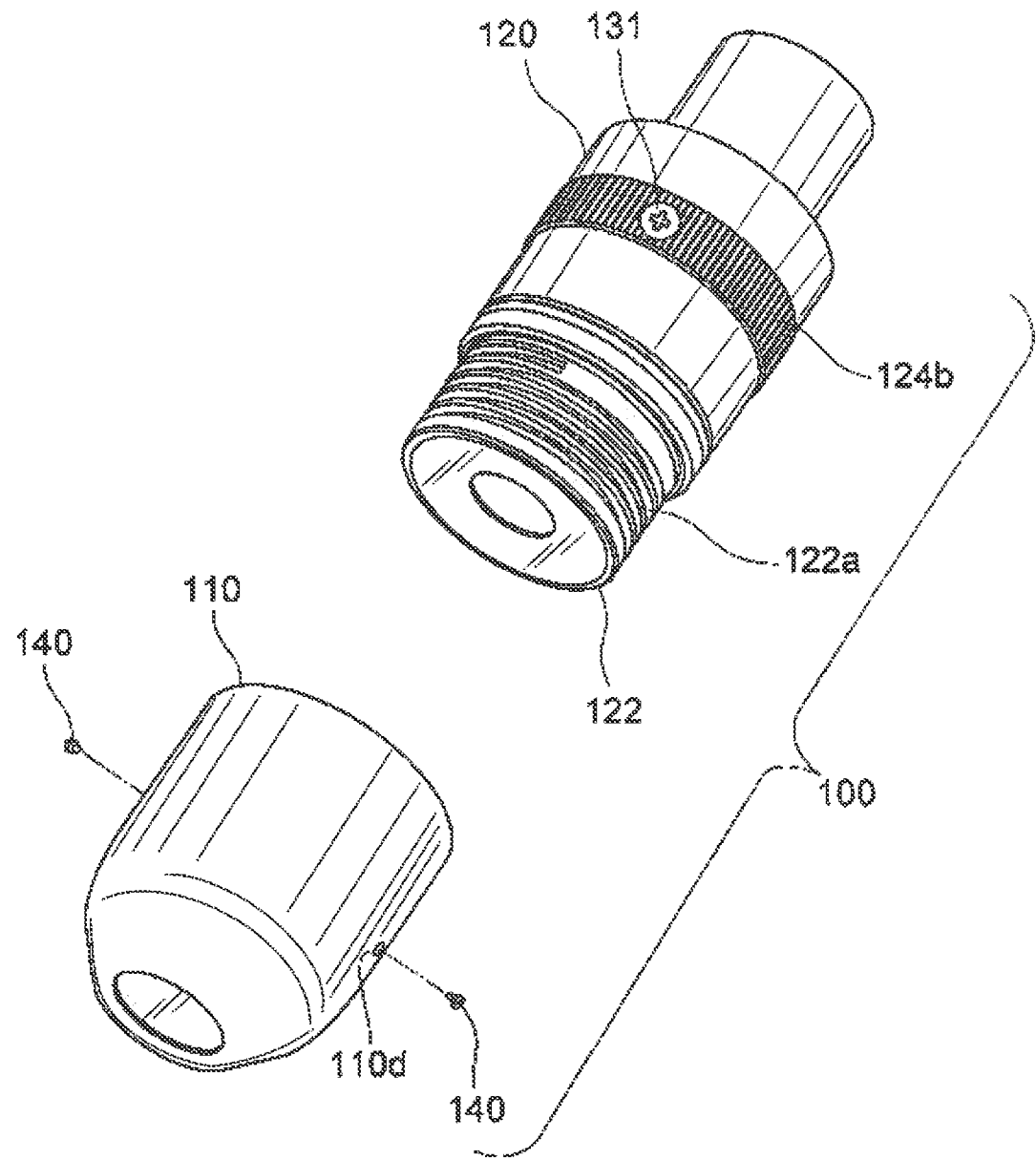
FIG. 2 is a perspective view illustrating a disassembled state of a loupe 100 according to one or more embodiments.

FIG. 2 is a perspective view illustrating a disassembled state of the loupe 100 according to one or more embodiments. As shown in FIG. 2, the loupe 100 includes a spinning cylinder 110 and a static unit 120. An adjuster 140 can be attached to a spinning cylinder 110. The spinning cylinder 110 and the static unit 120 constitute the tube framework.

Figure 3:
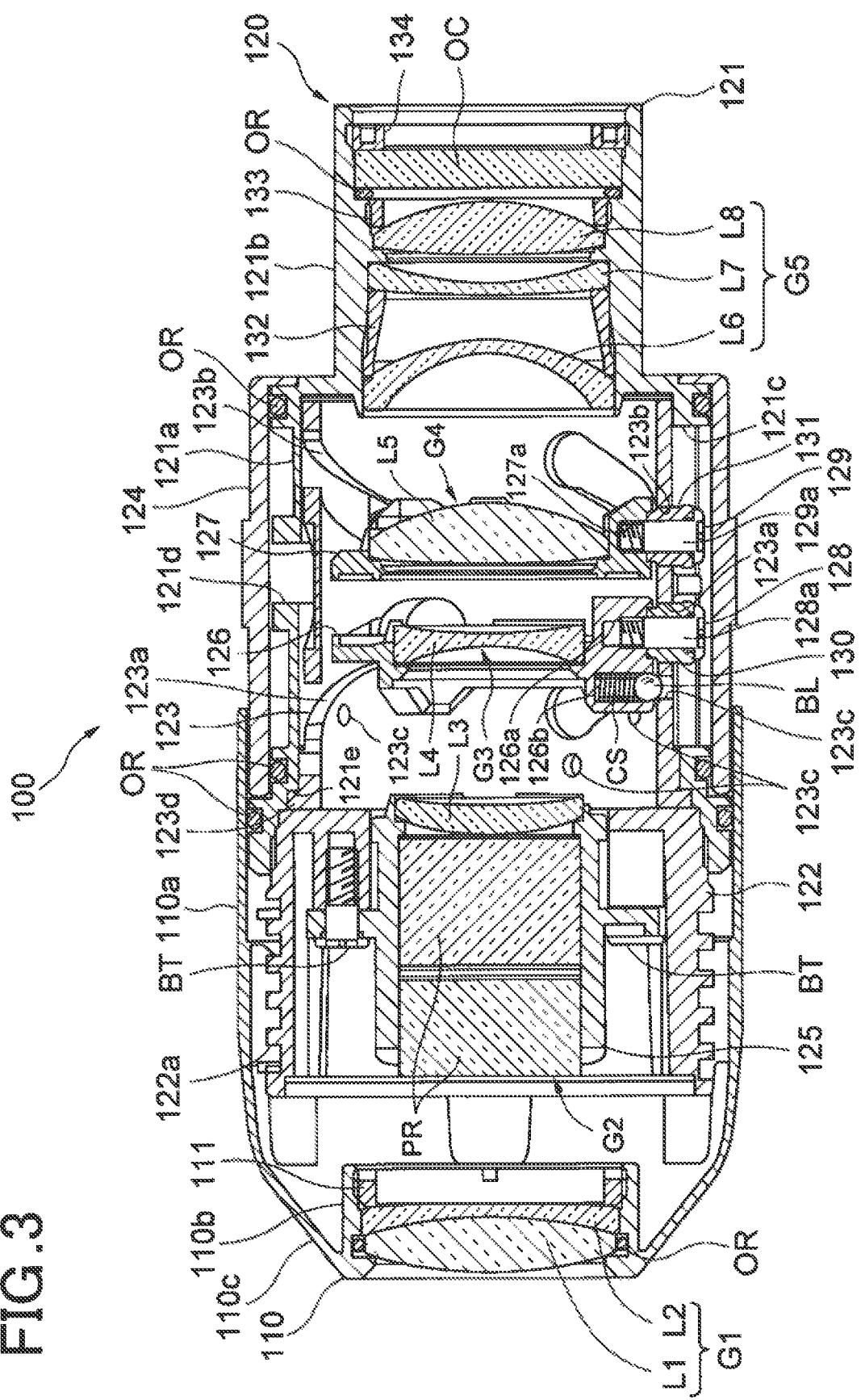
FIG. 3 is a cross-sectional view along the optical axis of a loupe 100 according to one or more embodiments.
Figure 4:
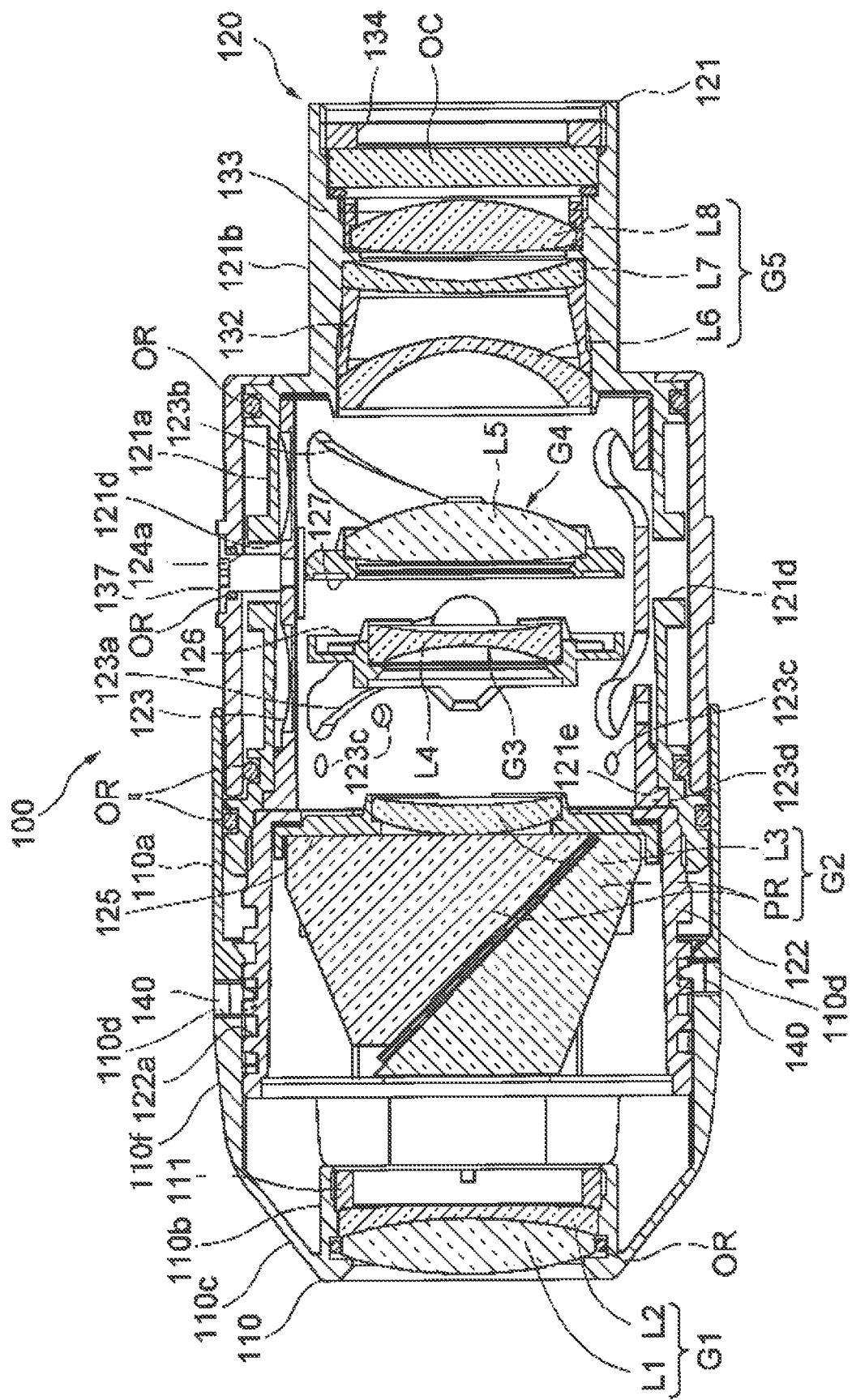
FIG. 4 is a cross-sectional view along the optical axis of a loupe 100 according to one or more embodiments.

FIG. 3 and FIG. 4 are cross-sectional views along the optical axis according to one or more embodiments, where these cross sections are mutually perpendicular. In FIGS. 3 and 4, the thin metal spinning cylinder 110 consists of a large cylinder segment 110a, and a small cylinder segment 110b disposed thereinside, and a taper portion 110c that are integrated into one piece. A first lens group G1 of lenses L1 and L2 is disposed in the small cylinder segment 110b, and is fixed to the spinning cylinder 110 with an annular fixation 111. The lens L1 adjacent to the object is surrounded by an O-ring OR to ensure dust-tight and water-proof sealing to the small cylinder segment 110b.

As illustrated in FIG. 4, a large cylinder segment 110a has two through holes 110d on the opposite sides. Each of the through holes 110d has a female screw on the inner periphery. The adjuster 140 has a male screw on the outer periphery and the adjuster 140 is attached to the spinning cylinder 110 by screwing together the male and female screws.

The static unit 120 includes a main static tube 121, a cylindrical prism holder 122 that is connected to an object end of the main static tube 121, a cum cylinder 123 that is disposed inside the main static tube 121, and an operable ring 124 disposed outside the main static tube 121.

The cylindrical prism holder 122, which has a substantially cylindrical shape, holds a lens frame 125 that is fixed to the cylindrical prism holder 122 with bolts BT (FIG. 3), where the lens frame 125 holds a Kepler prism PR generating an upright image and a lens L3. The prism PR and the lens L3 make up a second lens group G2. The cylindrical prism holder 122 has an outer face provided with a spiral groove 122a and is in contact with the leading end of an adjuster 140. Although not illustrated, the adjuster 140 has a concave at its top surface. The concave can engage with tools such as a screwdriver. The relation between the adjuster 140 and the spiral groove 122a will be described later.

A lens frame 126 holding a third lens group G3 being a lens L4 and a lens frame 127 holding a fourth lens group G4 being a lens L5 are disposed inside the cum cylinder 123 and are movable along the optical axis. The cum cylinder 123 has two circumferentially extending cum grooves 123a and 123b and circular openings 123c disposed at given intervals along the cum grooves 123a. The lenses L4 and L5 constitute a zoom lens (i.e., lens for changing magnification).

The lens frame 126 has three tapped holes 126a (only one hole is depicted in the drawing) on its outer periphery, and the end of a screw 128 having a cylindrical shaft 128a provided with a flange is installed into each of the tapped holes 126a. A turnable roller 130 is fit on a cylindrical shaft 128a and is fit on the scum groove 123a. The roller 130 can roll around the cum groove 123a of a cum cylinder 123.

A blind hole 126b is provided adjacent to one of the tapped holes 126a of the lens frame 126, and a coil spring CS and a ball BL are disposed in the blind hole 126b. The coil spring CS urges the ball BL radially outwardly. The position of the circular opening 123c corresponds to the position of the relatively rolling ball BL.

The end of a screw 129 having a flanged cylindrical axle 129a is screwed into each of the three screw holes 127a (only one hole is depicted in the drawing) provided on the periphery of the lens frame 127, a roller 131 fit onto the cylindrical axle 129a is inserted into the cum groove 123b and can roll on the cum groove 123b of a cum cylinder 123.

The main static tube 121 consists of a large cylinder segment 121a and a small cylinder segment 121b directly connected to each other. An end of the large cylinder segment 121a is connected to the cylindrical prism holder 122, and the inner face of the large cylinder has a linear groove 121c (FIG. 3) extending along the axis line. The heads of the screws 128 and 129 and the rollers 130 and 131 engage with the groove 121c so as to be relatively movable. The lens frames 126 and 127 can be shifted only along the linear groove 121c but cannot rotate.

The cum cylinder 123 is relatively rotatable inside the large cylinder segment 121a, and the operable ring 124 is relatively rotatable outside the large cylinder segment 121a. In FIG. 4, an aperture 124a is provided in the center of the operable ring 124, and a shoulder bolt 137 inserted into the aperture 124a extends through a circumferential groove 121d on the large cylinder segment 121a, is screwed onto the outer periphery of the cum cylinder 123, and puts the cum cylinder 123 into contact with the thick shaft portion. The operable ring 124 and the cum cylinder 123 rotates integrally while holding a predetermined space. Since a protruding portion 123d extending radially outwardly at the end of the cum cylinder 123 is accommodated in a cylindrical space defined between a circular dent 121e at the end of the large cylinder segment 121a and the end of the cylindrical prism holder 122, the cum cylinder 123 and the operable ring 124 cannot shift in the optical axis relative to the main static tube 121. The end of the large cylinder segment 110a of the spinning cylinder 110 surrounds the outer peripheries of the ends of the large cylinder segment 121a and the operable ring 124.

An O-ring OR is disposed between the shoulder bolt 137 and aperture 124a, and other O-rings OR are disposed between the large cylinder 121a and the operable ring 124 at their ends, respectively. These O-rings seal the relevant components dust-tightly and water-tightly. As shown in FIG. 2, an antiskid straight knurl 124b with periodic grooves is formed on the outer periphery of the operable ring 124.

Lenses L6 and L7 of a fifth lens group G5 are fixed inside the small cylinder segment 121b of the main static tube 121 and separated by a cylindrical spacer 132, and a lens L8 is fixed inside the small cylinder segment 121b with a cylindrical fixation 133. An eye lens OC (in one or more embodiments, a parallel plate) is fixed adjacent to the fifth lens group G5 with a ring fixation 134 inside the small cylinder segment 121b. An O-ring is disposed between the small cylinder segment 121b and the eye lens OC to seal these components dust-tightly and water-tightly. It should be noted that the lens groups G1 to G4 on the object side are referred to as a first optical system and the fifth lens group G5 on the eyepiece side is referred to as a second optical system.

Figure 5A:
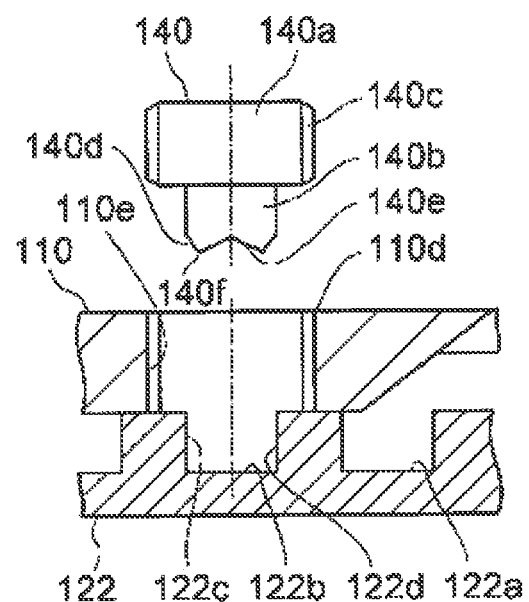
FIG. 5A is a cross-sectional view illustrating a disassembled state of a spinning cylinder 110 and the surroundings of a through hole 110d in a cylindrical prism holder 122 according to one or more embodiments.
Figure 5B:
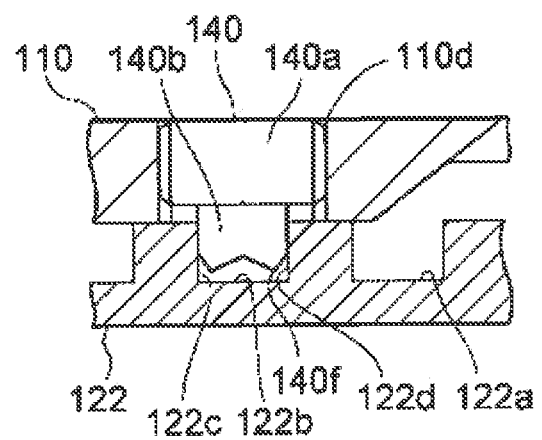
FIG. 5B is a cross-sectional view illustrating the state of a spinning cylinder 110 and the surroundings of a through hole 110d in a cylindrical prism holder 122 before the working distance is adjusted according to one or more embodiments.
Figure 5C:
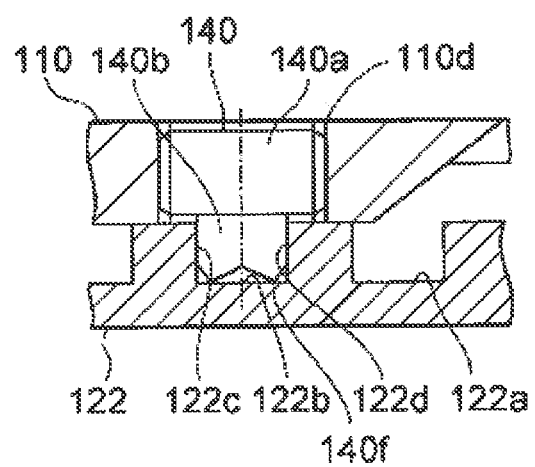
FIG. 5C is a cross-sectional view illustrating the state of a spinning cylinder 110 and the surroundings of a through hole 110d in a cylindrical prism holder 122 after the working distance is adjusted according to one or more embodiments.

FIG. 5A, FIG. 5B, and FIG. 5C are cross-sectional views illustrating the spinning cylinder 110 and surroundings of the through hole 110d in the cylindrical prism holder 122, depicted with the adjuster 140. In FIG. 5A illustrating a disassembled state, the adjuster 140 includes a first cylindrical segment 140a and a second cylindrical segment 140b coupled to each other. The second cylindrical segment 140b has a smaller diameter. The outer periphery of the first cylindrical segment 140a has a female screw 140c. The second cylindrical segment 140b, located at the distal end, has an outer tapered surface 140d which has a decreasing diameter toward the tip and an inner tapered surface 140e which has an increasing diameter toward the tip. In other words, the second cylindrical segment 140b has pointed cylinder segments 140f at the tip. The through hole 110d has a female screw 110e on the inner periphery.

The spiral groove 122a of the cylindrical prism holder 122 has a bottom face 122b and a pair of side faces 122c and 122d. The side faces 122c and 122d are perpendicular to the bottom face 122b. The outer diameter of the second cylindrical segment 140b is nearly equal to the distance between side faces 122c and 122d.

The adjustment of the working distance of the loupe 100 will now be described, where the adjustment involves the displacement of the first lens group G1 along the optical axis. In FIG. 2, when the large cylinder segment 110a of the spinning cylinder 110 is inserted (linearly, for example) in the static unit 120 along the optical axis, the cylindrical inner peripheral surface of the thick section 110f, which protrudes from the inner face of the large cylinder segment 110a (FIG. 4), fits on the outer peripheral surface of the spiral groove 122a in the cylindrical prism holder 122 without backlash. This guides the axis of the spinning cylinder 110 to match the axis of the static unit 120. After the spinning cylinder 110 is inserted to a predetermined position of the static unit 120, these components are assembled by screwing two male screws 140c of the adjuster 140 to the respective female screws 110e of the through hole 110d in the spinning cylinder 110. The assembled position of the top surface of the adjuster 140 should be flush with the outer peripheral surface of spinning cylinder 110 before adjusting the working distance, as illustrated in FIG. 5B. In these situations, the protruding amount of the second cylindrical segment 140b of the adjuster 140 is relatively small. This position is referred to as the slack position. When the adjuster 140 is in the slack position, the outer periphery of the second cylindrical segment 140b is disposed in the spiral groove 122a of the cylindrical prism holder 122 and comes into slidable contact with side faces 122c and 122d, although the tip of the adjuster 140 does not come into contact with bottom face 122b. Hence, adjuster 140 is guided along the side faces 122c and 122d.

The extending amount of the spinning cylinder 110 from the static unit 120 can be adjusted by the relative helical rotation of the spinning cylinder 110 to the static unit 120 while the adjuster 140 is being disposed at a slack position. This varies the distance along the axis between the first lens group G1 and the other lens groups G2 to G5, resulting in the setting of a desired working distance. Once the desired working distance is set, a tool not shown in the diagrams is inserted into a through hole 110d from the outside and engaged with an adjuster 140, and the adjuster 140 is further screwed as illustrated in FIG. 5c. The cylinder segment 140f with a pointed end of the adjuster 140 thereby comes into tight contact with the bottom face 122b of the spiral groove 122a. This position is referred to as a tightened position. The pressing force (frictional force) between the adjuster 140 and the spiral groove 122a in the tightened position is higher than the pressing force (frictional force) between the adjuster 140 and the spiral groove 122a in the slack position, which ensures the fixation of the spinning cylinder 110 to the static unit 120. Although the center of the tip of the adjuster 140 may be sharpened, such a sharp structure brings the risk of allowing the spinning cylinder 110 to rotate, due to a lack of fixing force when the tightness is weak in the tightened position. There is also a risk of leaving a scratch at the bottom face 122b of the spiral groove 122a when the pointed tip collides against the surface. In contrast, the cylinder segment 140f is free from these risks, making the adjuster 140 have a favorable structure. The nose shape may be modified.

When the working distance is reset, the adjuster 140 is rotated in the opposite direction to the slack position with a tool (not shown), so that the spinning cylinder 110 can be helically rotated relative to the static unit 120.

Figure 6:
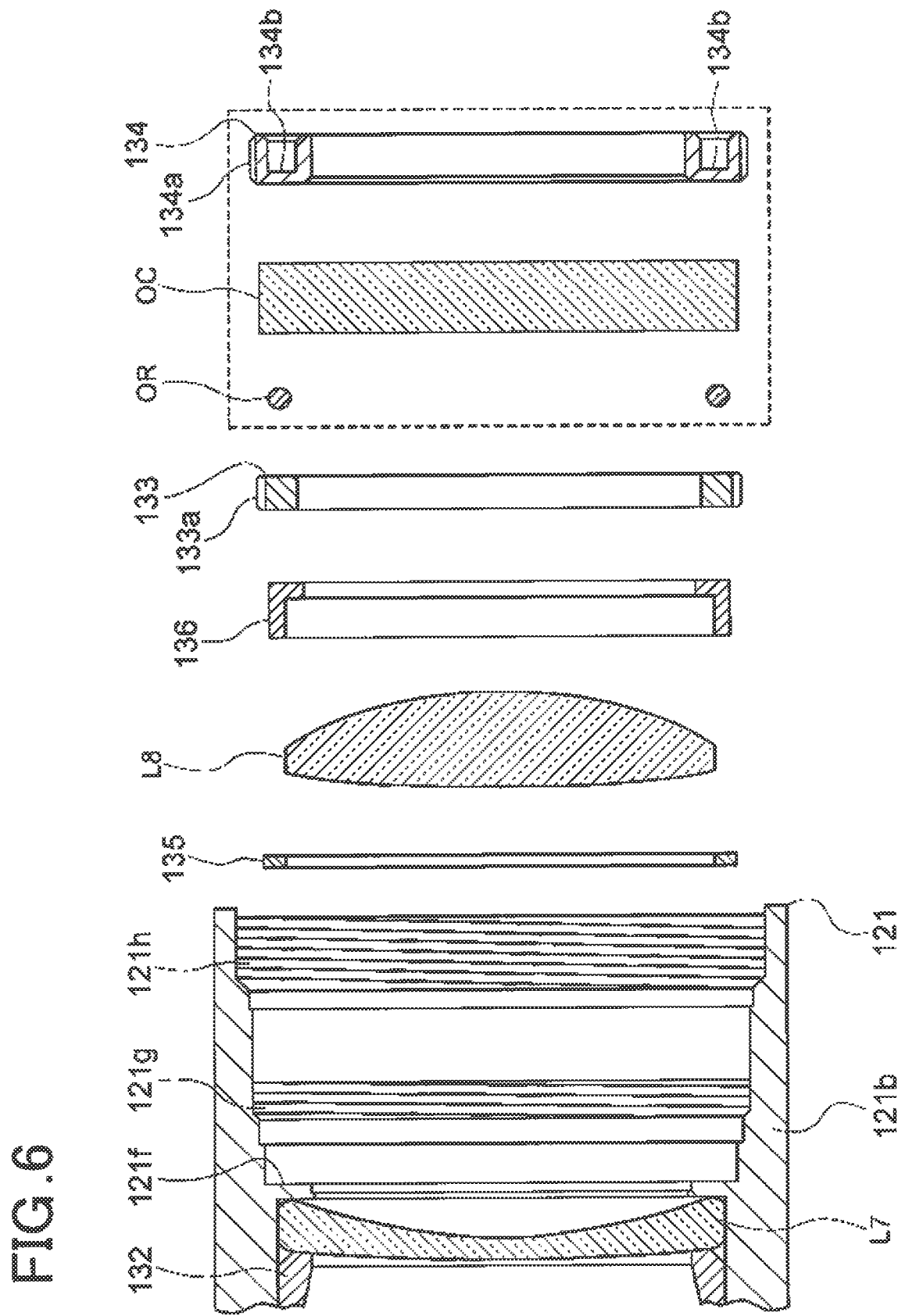
FIG. 6 is a cross sectional view illustrating a disassembled state of a group of eyepiece lens of a loupe 100 according to one or more embodiments.

FIG. 6 is a cross-sectional view illustrating the loupe 100 with a portion of the small cylinder segment 121b of main static tube 121 where the lenses on the eyepiece side are disassembled. The small cylinder segment 121b has an installation area which annularly protrudes from the inner periphery toward the center. Lenses L6 and L7 are separately fixed with cylindrical spacers 132 on the object side of the installation area 121f.

The process of mounting the lens L8 which is disposed nearest the eyepiece (farthest from the object) in the state of FIG. 6 will be described. A ring spacer 135 with a predetermined thickness is put into contact with the eyepiece side of the installation area 121f of the small cylinder segment 121b. Several spacers 135 with different thicknesses are preliminarily prepared and a spacer 135 with an appropriate thickness is used for adjustment as described below.

The annular holding member 136, which holds the lens L8, is inserted into the small cylinder segment 121b until it comes into contact with the spacer 135 and the holding member 136 is pressed toward the installation area 121f with a cylindrical fixation 133. The cylindrical fixation 133 has a male screw 133a on its outer periphery. The male screw 133a is fit to the first female screw 121g of the small cylinder segment 121b and screwed with a tool (not illustrated), so that the cylindrical fixation 133 can be pressed against the holding member 136 at a predetermined surface pressure.

An O-ring OR is disposed at the eyepiece side of the cylindrical fixation 133 and brought into contact with an eye lens OC. These are then urged against the cylindrical fixation 133 with a ring fixation 134. The ring fixation 134 has a male screw 134a on its outer periphery and several concaves 134b on the eyepiece side. The male screw 134a is fit into the second female screw 121h of the small cylinder segment 121b and screwed into the concave 134b with an unillustrated tool. The eye lens OC can thereby be urged at a predetermined surface pressure to deform the O-ring OR into a sealable state. If the spacer 135 is replaced with another one having a different thickness, the spacer 135 is removed in the reverse order of the above-mentioned procedure and reassembling is carried out in the same procedure with the other spacer 135. It should be noted that the eye lens OC, which is usually a plane-parallel glass, is unnecessary for the adjustment of the working distance (described below). Since the attachment and removal of the eye lens OC for replacement of the spacer 135 is a time-consuming procedure, the adjustment may be operated after temporarily removing all the components encircled in dotted lines in FIG. 6, including the eye lens OC, followed by assembling the components through the above-mentioned procedures.

The operation of the loupe 100 will now be explained. After a user wears the glasses-type holder GL on his head, he/she can observe an enlarged image of an object through the lens groups G1 to G5 in the loupe 100. The user can vary the magnification of the object image through rotation of the operable ring 124 accompanying the rotation of the cum cylinder 123. Although the screws 128 and 129 undergo rotary torque from the cum grooves 123a and 123b, the linear groove 121c blocks the rotation of these screws 123a and 123b. The user thus relatively moves the operable ring 124 along the cum grooves 123b and 123c and moves the lens frame 126 in one direction and the lens frame 127 in the opposite direction along the optical axis. Such an operation can vary the distance between the third lens group G3 and the fourth lens group G4 and thus vary the magnification. Everytime the ball BL engages with one of the circular opening 123c, the user feels some resistance of the operation of the operable ring 124 at his/her fingers, in other words, click feeling, and thus can intuit a variable level of magnification.

Figure 7:
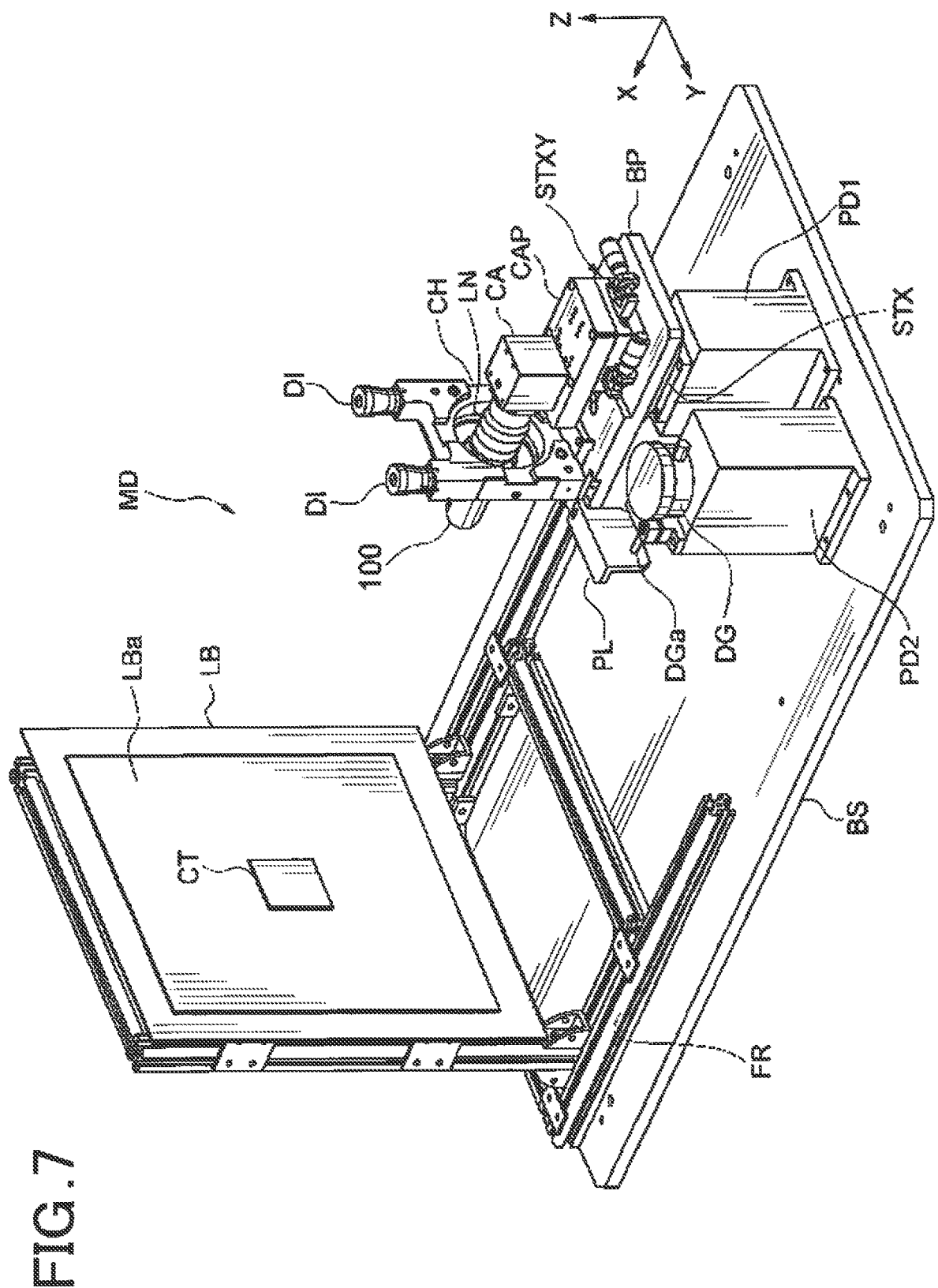
FIG. 7 is a perspective view of an adjusting device MD used for adjusting a loupe 100 according to one or more embodiments.
Figure 8:
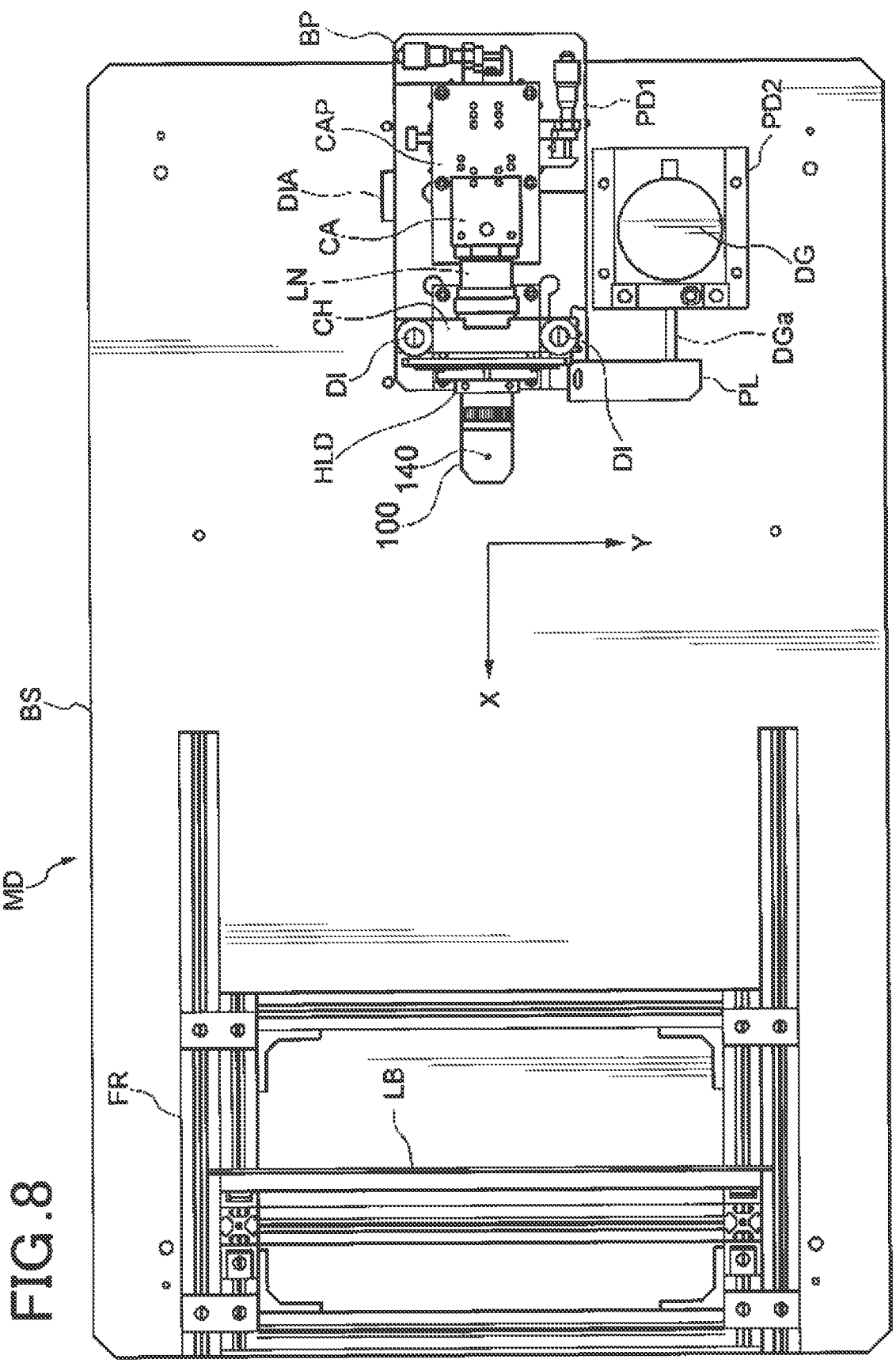
FIG. 8 is a top view of an adjusting device MD according to one or more embodiments.
Figure 9:
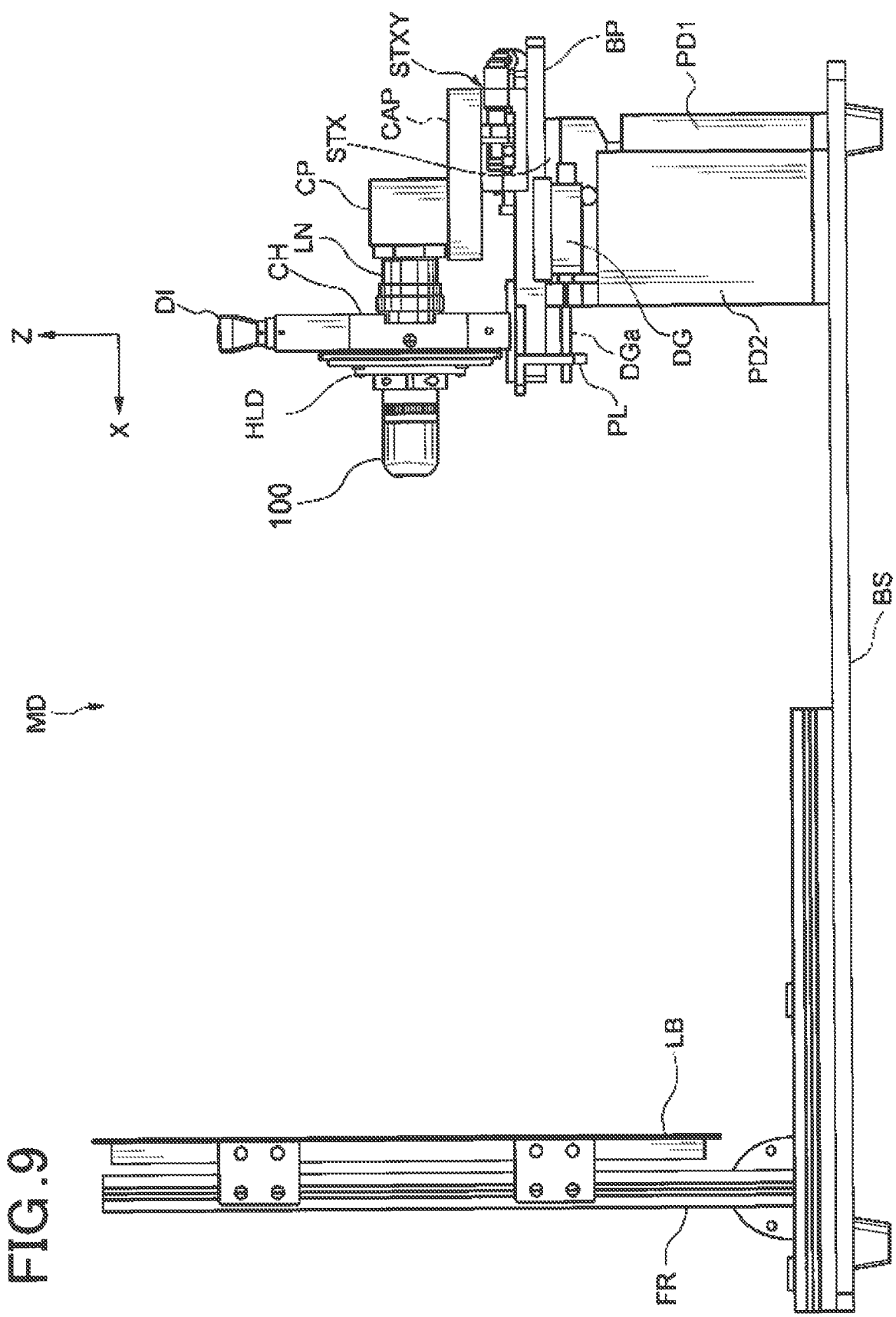
FIG. 9 is a side view of an adjusting device MD viewed from one side according to one or more embodiments.
Figure 10:
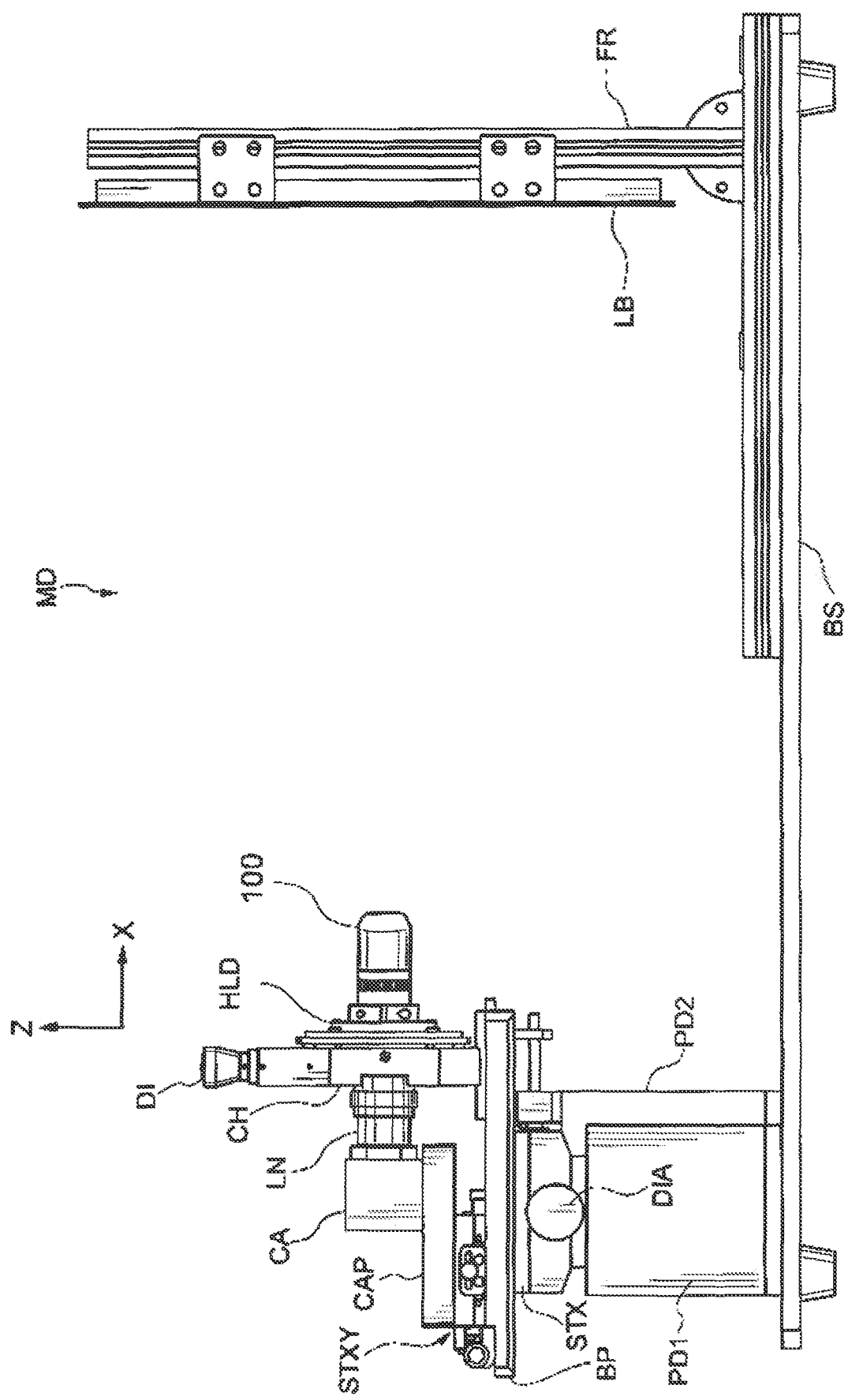
FIG. 10 is a side view of an adjusting device MD viewed from another side according to one or more embodiments.

The adjustment of the loupe 100 will now be explained. FIG. 7 is a perspective view of an adjusting device MD used for adjusting the loupe 100. FIG. 8 is a top view of the adjusting device MD. FIG. 9 is a side view of the adjusting device MD viewed from one side. FIG. 10 is a side view from another side.

In the drawing, a light box LB is vertically disposed on a horizontal base BS with a frame FR therebetween. A chart CT with a predetermined pattern (not illustrated) is disposed at the center of an irradiated surface LBa of the light box LB that includes an illuminant therein that emits light. In the drawing, the vertical direction is defined as the Z-axis, the normal direction to the chart CT as the X-axis, and the orthogonal direction to both the Z-axis and the X-axis as the Y-axis.

A first pedestal PD1 and a second pedestal PD2 is disposed on the base BS separated from the light box LB along the X-axis. As illustrated in FIG. 10, an X-axis stage STX, which can be shifted along the X-axis with a dial DIA, is installed on top of the first pedestal PD1. A base plate BP is fixed on top of the X-axis stage STX. An XY-axis stage STXY, which can be shifted along the X-axis and the Y-axis, is installed on top of the base plate BP. A camera plate CAP is installed on top of the XY-axis stage STXY.

A camera CA provided with a lens LN is installed on top of the camera plate CAP where the optical axis is parallel to the X-axis. Its position along the X-axis and the Y-axis can be adjusted by shifting the XY-axis stage STXY. The camera CA is connected to a monitor (not illustrated) with a cable (not illustrated) and an operator can check the chart image with the monitor.

A tilt stage CH is mounted to the top of the base plate BP. As illustrated in FIG. 8, a holder HLD is attached to the tilt stage CH so that the eyepiece side (main static tube 121) of the loupe 100 can be held in position. An adjustment dial DI on the tilt stage CH is turned to tilt the tilt stage CH. This enables the axis of the loupe 100 to align with the center of the chart CT. An operable ring 124 and a spinning cylinder 110 can be rotated while the loupe 100 is held in position.

A dial gage DG which measures the displacement of the chart CT and the loupe 100 along the X-axis, is placed on top of the second pedestal PD2. The gauge head DGa is brought into contact with the plate PL fixed to the base plate BP to measure the displacement of the base plate BP. The loupe 100 placed on top of the base plate BP shifts along the X-axis in cooperation with the shift of the X-axis stage STX along the X-axis through the operation of the dial DIA. In this state, the dial gage DG indicates the relative displacement along the X-axis of the loupe 100 to the fixed chart CT. poim The operation of the adjusting device MD in FIGS. 7 to 10 will now be explained. As illustrated in the diagrams, the loupe 100 is attached to the holder HLD and the end is set to the camera CA. The tilt stage CH is adjusted to align the optical axis of the camera CA with the center of the chart CT. When the pattern on the chart CT is imaged through the loupe 100 and the lens LN with the camera CA, the image signal sent from the camera CA is outputted to the monitor via a cable (not illustrated) and an operator can visually recognize the chart image on the monitor.

Figure 11:
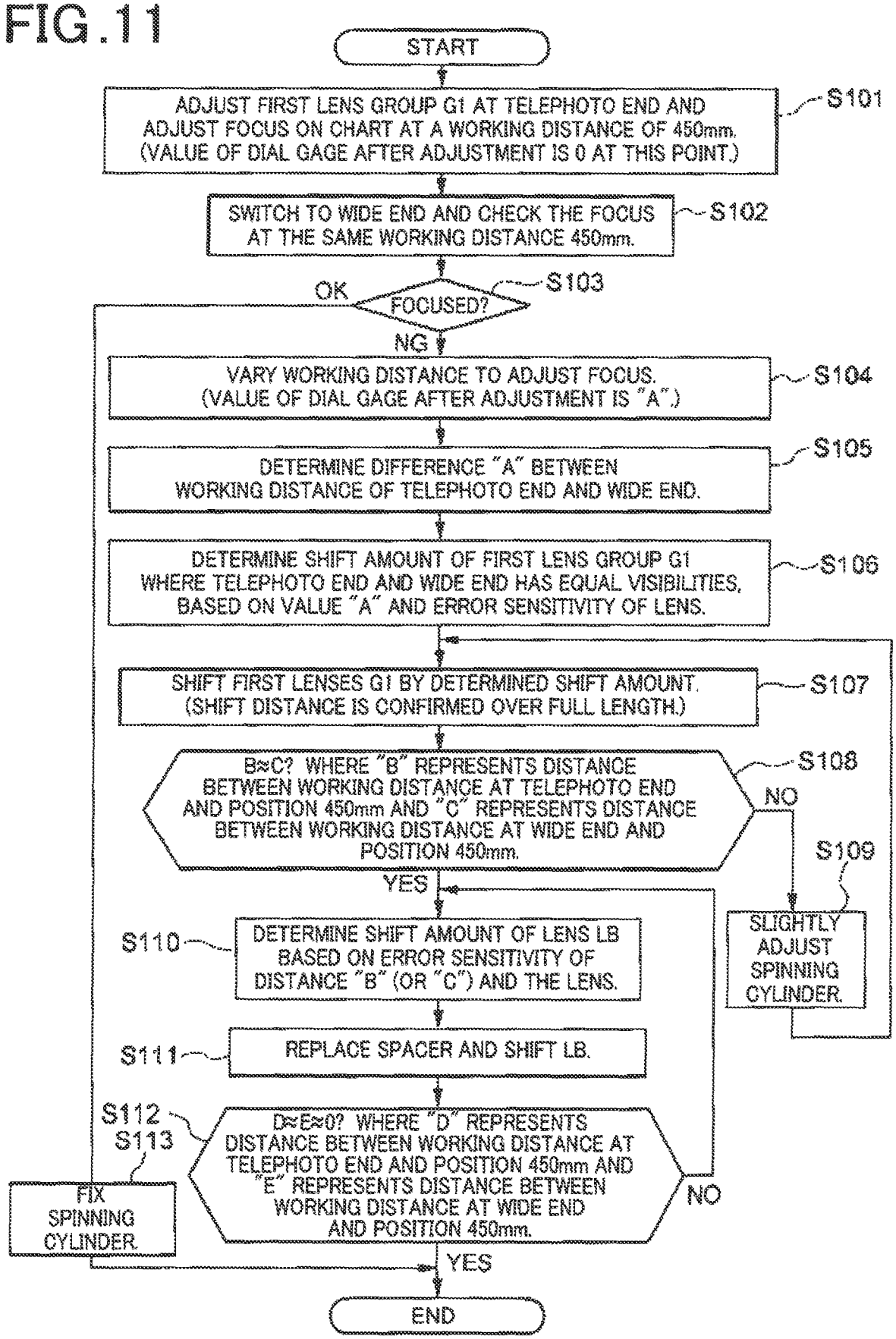
FIG. 11 is a flowchart illustrating a method for adjusting a loupe 100 according to one or more embodiments.

FIG. 11 is a flowchart illustrating a method for adjusting a loupe 100 according to one or more embodiments. The camera CA and the lens LN are preliminarily adjusted to a desired visibility (i.e., diopter). The following descriptions are based on the assumption that the loupe 100 is adjusted so that the visibility is −1 dpt at a working distance of 450 mm at both the telephoto end and the wide end, although the value of the working distance and the visibility can be arbitrarily set. A "reference point of loupe" is a point which is remote by a distance .alpha. (e.g. 10 mm) from the end of the loupe 100 on the eyepiece side along the X-axis. This is equivalent to the distance between the loupe 100 and the eye of the user. The distance of the chart CT and the loupe 100 from the reference point is called the working distance, which is equivalent to the distance between the eye and the object during observations.

At step S101 in FIG. 11, the operator turns the operable ring 124 (see FIG. 3) of the loupe 100 to adjust to the position at the telephoto end having the highest magnification rate (i.e. first magnification position) with the adjusting device MD where the dial gage DG is 0 at a working distance of 450 mm. The working distance can be adjusted by shifting the loupe along the X-axis with the dial DIA, where the distance of displacement from 450 mm is shown on the dial gage DG The adjuster 140 of the loupe (see FIG. 4) is in the slack position. A spacer 135 with a designed thickness is preliminarily mounted between the installation area 121f and the annular holding member 136 holding the lens L8 before the adjustment. The operator then turns the spinning cylinder 110 of the loupe to shift the first lens group G1 along the optical axis to focus on the chart CT. After the focusing, the visibility is −1 dpt at the telephoto end at a working distance of 450 mm.

At step S102, the operator adjusts the position at the wide end having the lowest magnification rate (i.e. second magnification position), and checks the focus of the chart CT. At step S103, the operator checks whether the focus matches at the wide end and the telephoto end. If the focus is retained after switching to the wide end (condition of step S103 is satisfied), the visibility is −1 dpt at a working distance of 450 mm at both the telephoto end and the wide end, and no further adjustment is required. In such a case, the operation proceeds to step S113 where the operator adjusts the adjuster 140 to the tightened position and fixes the spinning cylinder 110 to complete the tuning procedures.

In contrast, if the focus is not in match between the telephoto end and the wide end (i.e. the dial gage takes a number different from 0 and the condition of step S103 is unsatisfied) at step S104, the operator turns the dial DIA of the adjusting device MD to shift the loupe 100 along the X-axis and to focus on the chart CT by adjusting the working distance.

At step S105, the operator reads the value of the dial gage in focus (this value is referred to as "A"). The value "A" is the difference in working distance between the telephoto end and the wide end at a visibility of −1 dpt. It can also be said that the visibility is −1 dpt at the telephoto end, but deviates from −1 dpt (e.g. −0.8 dpt) at the wide end, at a working distance of 450 mm.

At step S106, the operator calculates the distance to displace the first lens group G1 along the optical axis where the difference in the working distance at the telephoto end and the wide end is zero. Specifically, this method is based on the property (called the error sensitivity) of the first lens group G1, such that the variation in the working distance corresponding to the displacement of the first lens group G1 at the telephoto end is different from the variation in the working distance corresponding to the displacement of the first lens group G1 at the wide end. The optimal displacement XL of the first lens group G1 (the value may be negative) is derived from the error sensitivity of the first lens group G1 determined preliminarily in the designing processes or in measurements.

At step S107, the operator detaches the loupe 100 from the holder HLD and measure the total length L of the loupe 100. The operator then turns the spinning cylinder 110 such that the total length is (L+XL), wherein XL represents the displacement of the first lens group G1. In other words, the displacement along the X-axis caused by the turning of the spinning cylinder 110 should be XL.

After displacing the first lens group G1 by the calculated value, at step S108, the operator reattaches the loupe 100 to the holder HLD and turn the dial DIA to check whether the working distances at the telephoto end and the wide end are as expected. The working distances at the telephoto end and the wide end are regarded as substantially equal not only at B=C but also, for example, 0.99B≤C≤1.01B or |B−C|=0.5 mm, wherein B corresponds to the value of the dial gage DG at the telephoto end (not 0) and C corresponds to the value of the dial gage DG at the wide end (not 0). However, any other case is also available. For B=C=−20 mm, the working distance approximately matches at the telephoto end and the wide end at 430 mm. In other words, the visibility at the working distance of 450 mm matches at a value that deviates from −1 dpt, i.e. the visibility matches at −0.9 dpt at both the telephoto end and the wide end. If the values of distance "B" and "C" are not approximately equivalent, at step S109, the operator turns the spinning cylinder 110 in the same manner as the above-mentioned procedure and finely tunes the position of the first lens group G1 along the optical axis. The operator then returns to step S107 and repeats the same procedures.

If the values "B" and "C" shown on the dial gage DG are approximately equal, the operator proceeds to step S110. In this step, the operator calculates the displacement of the lens L8 along the optical axis that is necessary for adjusting the working distance to the desired value (450 mm in this case), based on the error sensitivity and the measured values "B" and "C".

Next, the operator selects a spacer 135 with a thickness that suffice the calculated displacement of the lens L8 along the optical axis. At step S111, the loupe 100 is disassembled as illustrated in FIG. 6 (as mentioned above, the eye lens is not mounted until the adjustment is complete), and the operator replaces the initially mounted spacer 135 of the designed thickness with the selected spacer 135. In one or more embodiments, this process be carried out while the loupe 100 is being attached to the holder HLD. Alternatively, the loupe 100 may be detached from the holder HLD and reattached after the replacement.

At step S112 (final stage), the operator turns the operable ring 124 (see FIG. 3) of the loupe 100 to set to the telephoto end, turns the dial DIA, and measures the working distance of which the chart CT is focused. The value of the dial gage at this point is referred to as D. The operator then switches the loupe to the wide end, and measures the working distance. The value of the dial gage at this point is referred to as "E". Condition D=E=0 is satisfied if the visibility is −1 dpt at the desired working distance of 450 mm at both the telephoto end and the wide end. It is considered to be approximately equal if, for example, conditions −2 mm<D, E<2 mm, and |D−E|=1.0 mm are satisfied. However, any other case is also available. If the working distance is approximately equal as in this case, the operator sets the adjuster 140 to a tightened position and fixes the spinning cylinder to complete the procedures. Thereafter, the eye lens OC, for instance, can be attached. If the difference between the value "D" and the value "E" is greater than the desired value, the operator returns to step S110, recalculates the displacement of the lens L8 along the optical axis, and carries out the same procedures.

Figure 12:
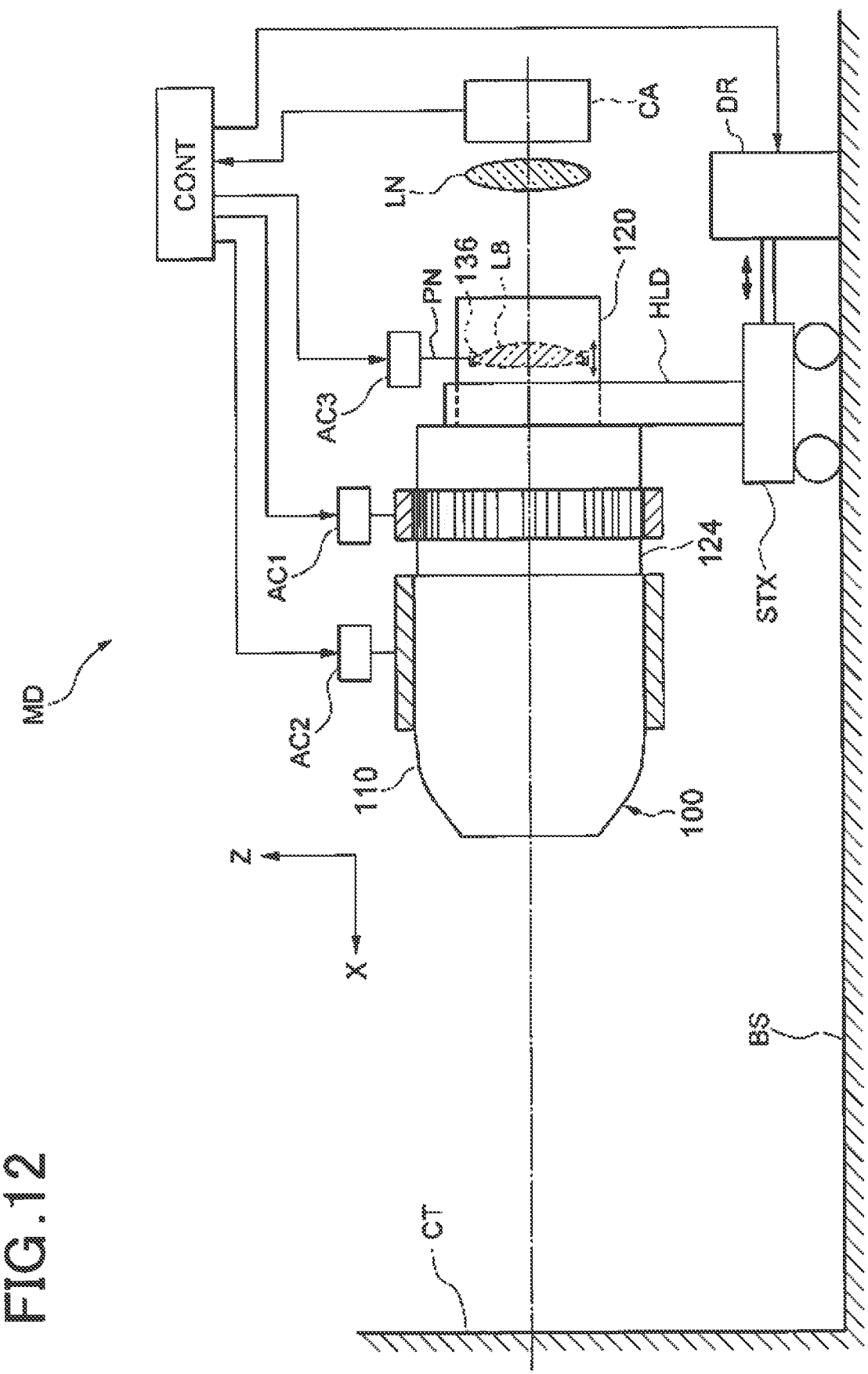
FIG. 12 is an outline side view of an adjusting device MD that automatically adjusts a loupe 100 according to one or more embodiments.

Automatic adjustment of a loupe 100 with a controller will now be described. FIG. 12 is an outline side view of an adjusting device MD that automatically adjusts a loupe 100. The adjusting device MD illustrated in the drawing is equipped with a camera CA with a lens LN, a first actuator AC1 for rotating an operable ring 124, a second actuator AC2 for rotating the spinning cylinder 110, a third actuator for displacing a lens L8 along the optical axis, a drive unit DR, and a control unit CONT for controlling these devices. The drive unit DR can drive the X-axis stage STX along the X-axis in relation to the horizontal base BS and also detect its driving amount, where the X-axis stage STX is mounted with a holder HLD that holds a static unit 120 of a loupe 100. The following descriptions are based on the assumption that the visibility is adjusted to −1 dpt at a working distance of 450 mm at both the telephoto end and the wide end.

The optical axis of the camera CA is preliminarily adjusted to be aligned with the center of the chart CT, which is fixed on the base BS and extends in the vertical direction. In this state, the camera CA captures the pattern on the chart CT through the loupe 100 and the lens LN. The image signal is sent from the camera CA to the control unit CONT, and the control unit CONT calculates the contrast of the chart image based on the image signal. Since the contrast varies with the state of the focus, the control unit CONT drives the drive unit DR to finely shift the camera CA and the loupe 100 along the X-axis and calculates the contrast at each shifted point. The position causing the greatest contrast is determined to be the focal position, and the displacement of the X-axis stage STX in this state can be measured. In other words, the control unit CONT can determine the focal position through cooperation of the drive unit DR with the camera CA.

It should be noted that the loupe 100 in this example is different from the above-mentioned embodiments in that the holding member 136 holding the lens L8 is equipped with male screws on its outer periphery and the small cylinder segment 121b equipped with the engaging female screws. The third actuator AC3 can rotate the holding member 136 with, for instance, the pin PN inserted through the aperture formed on the small cylinder segment 121b. When the third actuator AC3 rotates the holding member 136, the lens L8 is displaced along the optical axis relative to the small cylinder segment 121b. Other structures are identical to the above-mentioned embodiments.

FIG. 13 is a flowchart illustrating the adjustment of the loupe 100 in accordance to one or more embodiments. Although the preliminaries are identical to the above-mentioned embodiments, the adjuster 140 is loosened and the spinning cylinder 110 is rotatable. At step S201 of FIG. 13, the control unit CONT allows the first actuator AC1 to rotate the operable ring 124 to the state of the telephoto end. In addition, the control unit CONT determines the focal position through the cooperation of the camera CA with the drive unit DR, where this relative position is referred to as a tele reference value "0", i.e. the origin. At this point, the visibility is −1 dpt when the working distance is set to a prescribed value "H" of 450 mm at the telephoto end. Subsequently, the control unit CONT allows the first actuator AC1 to rotate the operable ring 124 to the state of the wide end, determines the focal position through the cooperation of the camera CA with the drive unit DR, and determines the relative shift amount F of the chart CT and the loupe 100 from the tele reference value "0".

At step S202, the control unit compares the relative shift amount F to the tele reference value "0" to determine whether F=0 is satisfied. If the focus is retained after the switching to the wide end (determined to be YES), the visibility is −1 dpt at a working distance of 450 mm at both the telephoto end and the wide end, and no further adjustment is required. Hence, the determination at step S204 is also evaluated as YES, and, each part is fixed. The adjustment procedure is thereby complete. In contrast, if F=0 is evaluated as NO, the control unit CONT finely rotates the spinning cylinder 110 with the second actuator AC2 at step S203.

The procedure returns again to step S201. The control unit CONT allows the first actuator AC1 to rotate the operable ring 124 to the state of the telephoto end. In addition, the control unit CONT determines the focal position through the cooperation of the camera CA with the drive unit DR, and the new relative position is set as a tele reference value "0". Subsequently, the control unit CONT allows the first actuator AC1 to rotate the operable ring 124 to the wide end, determines the focal position through the cooperation of the camera CA and the drive unit DR, and derives the relative shift amount F of the chart CT and the loupe 100 relative to the tele reference value "0". These operations are repeated until the relative shift amount F is approximately equal to 0. The determination of the condition "approximately equal" is identical to the descriptions in the above-mentioned embodiments. When F is approximately equal to 0, the operator may tighten the adjuster 140 and may also fix the spinning cylinder 110.

If the relative shift amount F is approximately equal to 0, the control unit CONT measures the working distance G at the current telephoto end (or the wide end) based on the relative shift amount from the origin, at step S204, and then determines whether the working distance G is approximately equal to the prescribed working distance H (=450 mm). In usual cases, the working distances are in the relation of G≠H (i.e. condition in step S204 is evaluated as NO). The procedure goes to step S205 where the control unit CONT allows the third actuator AC3 to finely shift the lens L8 along the optical axis. Hereby, the values of the working distance at both the telephoto end and the wide end vary together.

At step S206, the control unit CONT determines the focal position through the cooperation of the camera CA with the drive unit DR and calculates the working distance G at the telephoto end (or the wide end). The procedure then returns to step S204, and the control unit CONT determines whether the working distance derived from the displacement of the lens L8, is equal to the prescribed working distance H. This operation is repeated until the working distance G and H are equal. When the two values are equal, the adjustment is completed. The operator applies an adhesive into the aperture of the small cylinder segment 121b to fix the small cylinder segment 121b to the holding member 136. This operation fixes the position of the lens L8 along the optical axis. According to one or more embodiments, the operator does not always calculate the displacement of lenses L1 and L8. The adjustment can be carried out efficiently by the repetition of mechanical operations. It should be noted that the operator may manually carry out either the steps S201 to S203 or steps S204 to S206.

It is apparent from one or more embodiments and technical concept described in the specification for a person skilled in the art that the embodiments described in the specification should not be construed to limit the scope of the present invention and should include any other embodiments and variation. The description and embodiments described in the specification are for illustrative purposes and the scope of the present invention is described in Claims. For example, the lens in the first optical system to displace along the optical axis during the adjustment is not limited to the lens L1 closest to the object; it may be any lens. Also, the lens in the second optical system to displace along the optical axis during the adjustment is not limited to the lens L8 farthest from the object; it may be any lens. In addition, the first magnification position is not limited to the telephoto end and the second magnification position is not limited to the wide end; it may be a determined intermediate position.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

As described above, the loupe and the method for adjusting the loupe of one or more embodiments of the present invention can be applied when a user observes an object.

REFERENCE SIGNS LIST

AC1 to AC3 actuator
BL ball
BP base plate
BS base
BT bolt
CA camera
CAP camera plate
CH tilt stage
CONT control unit
CS coil spring
CT chart
DG dial gage
DI adjustment dial
DR drive unit
FR frame
G1-G5 lens groups
GL glasses-type holder
HLD holder
L1-L8 lenses
LS transparent plate
LSa hole
MD adjusting device
OC eye lens
OR O-ring
PD1 first pedestal
PD2 second pedestal
PR prism
LB light box
STX X-axis stage
STXY XY-axis stage
100 loupe
110 spinning cylinder
110a *large cylinder segment*
110b small cylinder segment
110c taper portion
110d through hole
110e female screw
110f thick section
111 fixation
120 static unit
121 main static tube
121a large cylinder segment
121b small cylinder segment
121c linear groove
121d circumferential groove
121e circular dent
121f installation area
121g first female screw
121h second female screw
122 cylindrical prism holder
122a spiral groove
122b bottom face
122c side face
123 cum cylinder
123a cum groove
123b cum groove
123c circular opening
123d protruding portion
124 operable ring
124a aperture
124b straight knurling
125 lens frame
126 lens frame
126a hole
126b blind hole
127 lens frame
127a hole
128 screw
128a cylindrical shaft
129 screw
129a cylindrical shaft
130,131 rollers
132 cylindrical spacer
133 cylindrical fixation
133a male screw
134 ring fixation
134a male screw
134b concave
135 spacer
136 holding member
137 shoulder bolt
140 adjuster
140a first cylindrical segment
140b second cylindrical segment
140c male screw
140d outer tapered surface
140e inner tapered surface
140f cylinder segment

The invention claimed is:

1. A method for adjusting a loupe that allows a user to view an enlarged image of an object, wherein the loupe comprises an eyepiece and a tube framework having a first optical system adjacent to the object and a second optical system adjacent to the eyepiece, wherein at least two zoom lenses in the first and second optical systems shift along an optical axis between a first magnification position and a second magnification position different from the first magnification position to change magnification, and wherein the method comprises:

at the first magnification position, obtaining a first working distance of the loupe at which the object is focused;

at the second magnification position, obtaining a second working distance of the loupe at which the object is focused;

shifting at least one lens in the first optical system along the optical axis based on a difference between the first and second working distances to make a difference between a target working distance and the first working distance substantially equal to a difference between the target working distance and the second working distance; and after the difference between the target and first working distances is made substantially equal to the difference between the target and second working distances, shifting at least one lens in the second optical system along the optical axis based on the difference between the target working distance and either the first or second working distance such that the object is focused at a predetermined diopter when the at least two zoom lenses are shifted to either the first magnification position or the second magnification position.

2. The method for adjusting the loupe according to claim 1, wherein the first magnification position is a telephoto end and the second magnification position is a wide end.

3. The method for adjusting the loupe according to claim 1, wherein the at least one lens in the first optical system is closest to the object.

4. The method for adjusting a loupe according to claim 1, wherein the at least one lens in the second optical system is farthest from the object.

5. The method for adjusting a loupe according to claim 1, further comprising:

shifting the at least one lens in the second optical system along the optical axis by inserting a spacer of a predetermined thickness between an installation area of the tube framework and the at least one lens in the second optical system.

6. The loupe adjusted in the method according to claim 1.

* * * * *